US006959091B1

(12) United States Patent
Sabin

(10) Patent No.: US 6,959,091 B1
(45) Date of Patent: Oct. 25, 2005

(54) CRYPTOGRAPHY PRIVATE KEY STORAGE AND RECOVERY METHOD AND APPARATUS

(75) Inventor: Michael John Sabin, Sunnyvale, CA (US)

(73) Assignee: Atmel Corporation, San Jose, CA (US)

( * ) Notice: Subject to any disclaimer, the term of this patent is extended or adjusted under 35 U.S.C. 154(b) by 1023 days.

(21) Appl. No.: 09/627,927

(22) Filed: Jul. 28, 2000

(51) Int. Cl.$^7$ .............................................. H04L 9/00
(52) U.S. Cl. ........................................ 380/286; 380/44
(58) Field of Search .......................... 380/44, 277, 286, 380/28, 30

(56) References Cited

U.S. PATENT DOCUMENTS

| 5,848,159 | A | | 12/1998 | Collins et al. ................. 380/30 |
| 6,154,541 | A | * | 11/2000 | Zhang .......................... 380/28 |
| 6,266,421 | B1 | * | 7/2001 | Domyo et al. .............. 380/286 |
| 6,708,273 | B1 | * | 3/2004 | Ober et al. .................. 713/189 |

FOREIGN PATENT DOCUMENTS

WO             02/11360      *   2/2002     ............. H04L 9/30

OTHER PUBLICATIONS

Quisquater et al, "Fast Decipherment Algorithm for RSA Public-Key Cryptosystem", Aug. 27, 1982, Philips Research Laboratory, p. 1-2.*

Becker et al, "The Chinese Remainder Problem, Multivariate Interpolation, and Grober Bases", 1991, ACM, p. 64-69.*

C. Lim et al., "Saprse RSA Secret Keys and Their Generation", Proc. of 3rd Annual Workshop on Selected Areas in Crypotgraphy, pp. 117-131, Aug. 1996.

Digital Signature Standard (DDS), FIPS PUB 186-2, U.S. Department of Commerce/National Institute of Standards and Technology, pp. 1-70, Jan. 27, 2000.

* cited by examiner

*Primary Examiner*—Christopher Revak
(74) *Attorney, Agent, or Firm*—Sierra Patent Group, Ltd.

(57) ABSTRACT

Disclosed herein is a system and method for storage and recovery of a private key in a cryptographic system by providing a parameterization of the private key that uses less storage space than the full CRT parameter set $\{p, q, d_p, d_q, v\}$ and that provides better computational efficiency than the minimal parameter set $\{p, q\}$. Also disclosed is a system and method for storage and recovery of a private key in a cryptographic system by providing a parameterization of the private key that uses less storage space than the full non-CRT parameter set $\{n, d\}$ and that provides better computational efficiency than the minimal parameter set $\{p, q\}$. Furthermore, disclosed herein is a means for computing the parameters $d_p$, $d_q$, and d in a manner such that the computational sequence is independent of the values of the prime factors p and q, thereby reducing vulnerability to attacks that exploit such dependence.

69 Claims, 8 Drawing Sheets

CRYPTOGRAPHY PRIVATE KEY STORAGE AND RECOVERY METHOD AND APPARATUS

BACKGROUND OF THE INVENTION

1. Field of the Invention

The present invention relates generally to cryptography systems. More particularly, the present invention relates to an apparatus and method for storing and recovering the private key in a public-key/private-key cryptography system.

2. The Prior Art

The RSA (Rivest, Shamir, and Adelman) scheme is a popular form of public-key cryptography. The RSA scheme uses: a public key, consisting of a public modulus n and a public exponent e; and a private key, consisting of the modulus n and a private exponent d. The public modulus n is an integer that is the product of two distinct prime factors p and q, i.e., n=pq. The factors are secret information and not disclosed by the holder of the private key. The public exponent e is an integer that is relatively prime to the values (p−1) and (q−1). The private exponent d is an integer such that ed mod (p−1)=ed mod (q−1)=1.

One application of the RSA scheme is to encrypt messages. Any party can use the public key to encrypt a message that can only be decrypted by the holder of the private key. Let m be the message to be encrypted, where m is an integer in the range 0<m<n. The encrypted message c is computed as $c=m^e$ mod n. To decrypt the encrypted message, the holder of the private key computes $m=c^d$ mod n. For instance, party A wishing to send an encrypted message to party B would encrypt the message by obtaining party B's public key. Since the message can only be decrypted with the correct party B private key that will be associated with the party B public key, only party B is able to decrypt the message.

Another application of the RSA scheme is to sign messages. The holder of the private key can apply a signature to a message that can be verified by any party using the public key. Let m be the message to be signed, where m is an integer in the range of 0<m<n. The signature s is computed as $s=m^d$ mod n. To verify the signature, any party uses the public key to compute $m'=s^e$ mod n. If the value of m' matches the value of m, the signature is valid.

The security of the RSA scheme rests on the presumed difficulty of determining the factors of the public modulus. That is, given n, it is believed to be very difficult to determine the factors p and q such that n=pq. The difficulty of the factoring problem increases as the size of p and q increases. In a practical implementation, p and q each consist of hundreds or thousands of binary digits (bits); since n is the product of p and q, it, too, consists of hundreds or thousands of bits.

The modular exponentiation operation used in RSA is a computationally expensive operation. The complexity of the operation increases approximately linearly with the number of bits in the exponent and quadratically with the number of bits in the modulus. Fortunately, there are some well-known methods that reduce the computational expense.

To reduce the expense of the public-key operation, it is common to pick the public exponent to be a small number. This is acceptable because the security of the RSA scheme is largely independent of the size of the public exponent. A popular choice for the public exponent is $e=2^{16}+1$; this value appears to be emerging as a defacto standard for new applications. Other common choices are e=3 and e=17. With a small public exponent, the computational expense of the RSA public-key operation is relatively small. In other words, it is relatively inexpensive to encrypt a message or verify a signature.

Unfortunately, the private exponent d cannot be picked small. Its value cannot be freely chosen; it must satisfy the condition that ed mod (p−1)=ed mod (q−1)=1. The security of the RSA scheme rests on p and q being large and arbitrarily selected. As a result, d is an integer of a size comparable to that of the public modulus n. This makes the expense of the private-key operation relatively high. In other words, it is relatively expensive to decrypt a message or create a signature.

The expense of private-key operation can be reduced by using the Chinese Remainder Theorem (CRT). The CRT requires the computation of several quantities, as follows:

$$d_p = d \bmod (p-1);$$

$$d_q = d \bmod (q-1);$$

v such that pv mod q=1.

Then, the private-key operation $y=g^d$ mod n is computed as:

$$a=(g \bmod p)^{d_p} \bmod p;$$

$$b=(g \bmod q)^{d_q} \bmod q;$$

$$y=a+[(b-a)v \bmod q]p.$$

If the expense of computing $d_p$, $d_q$, and v is neglected, the computational expense of the private-key operation using the CRT is about one-fourth that of the private-key operation not using the CRT. This is a large reduction in computational expense, and it makes the CRT desirable for many applications.

Unfortunately, the expense of computing $d_p$, $d_q$, and v is not necessarily negligible. Accordingly, many applications simply precompute the values of $d_p$, $d_q$, and v and store them along with the factors p and q as part of the private key. An application that stores the parameter set $\{p, q, d_p, d_q, v\}$ can perform the private-key operation using the CRT with the least possible computational expense. Each of the five parameters requires b bits of storage, where b is the number of bits in a prime factor of the modulus. Thus, the total storage for the private key is 5b bits.

In some applications, however, storing the private key as $\{p, q, d_p, d_q, v\}$ is not desirable because of the amount of storage space required. If the application instead stores the private key as $\{p, q\}$, the private-key storage space is reduced from 5b bits to 2b bits, a reduction by a factor of 2.5. However, the application must then compute $d_p$, $d_q$, and v each time it performs a private-key operation. This may be an undesirable computational expense.

An example of an application where these issues are a concern is a low-cost smart card used to create digital signatures. The card stores a set of RSA private keys, with each key used to create signatures for a different purpose. For example, one key might be used to sign purchases made with a particular credit card; another key may be used to sign electronic mail messages; another key might be used to sign bank transactions; and so on. Because of its low cost, the smart card has a limited amount of storage space. It is desirable for the card to store as many private keys as possible in the limited space. Furthermore, because of its low cost, the smart card has a simple processor with limited computing capability. Since it is undesirable for the signature computation to take an inordinate amount of time, it is important to minimize the computational expense of the RSA private-key operation.

Another issue associated with computing $d_p$, $d_q$, and v is security. A common way to compute $d_p$, $d_q$, and v from p and q is to use Euclid's algorithm, or common variations thereof. Euclid's algorithm is a sequence of arithmetic operations that can be used to solve the problem, "Given integers x and z, find y such that xy mod z=1." The sequence of operations depends on the numerical values of the operands; that is, a change in the numerical values of y or z may cause a change in the order of arithmetic operations such as multiply, subtract, etc. Such dependency may make the private key stored within an application vulnerable to discovery by an attacker who cleverly chooses inputs to the application while measuring externally available responses such as electrical current draw, electromagnetic emissions, etc. Such attacks have been successfully carried out on actual security devices, both commercial and governmental. To reduce vulnerability to such attacks, it is desirable that the sequence of operations used to compute $d_p$, $d_q$, and v not change with the values of p and q.

Continuing with the example of the low-cost smart card, the card includes an arithmetic coprocessor that accelerates the modular exponentiation operations used in RSA. During private-key operations, the modular exponentiation is vulnerable to attacks of the type just described. To reduce vulnerability to such attacks, the coprocessor is carefully designed to ensure that its sequence of operations does not depend on the values of the operands. If, however, the smart card is also required to compute $d_p$, $d_q$, and v during an RSA private-key operation, then the computation of $d_p$, $d_q$, and v is an additional source of potential vulnerability. To reduce this added vulnerability, the computation of $d_p$, $d_q$, and v must use a sequence of operations that does not depend on the values of p and q. Since p and q are prime values, v may be computed using modular exponentiation via the operation $v = p^{q-2}$ mod q. Thus, the smart card may use the coprocessor to compute v, eliminating any new vulnerability associated with computing v. However, it is not possible to compute $d_p$ and $d_q$ using modular exponentiation. Thus, some scheme is needed to compute $d_p$ and $d_q$ in a way that does not introduce a new vulnerability.

Although the preceding discussion has focused on applications that use the CRT, not all applications do. Some applications perform the private-key operation without using the CRT, since that is a simpler (although more expensive) operation. In some such applications, storage space and security are still important issues.

The most direct way to store the private key in a non-CRT application is to store the parameters {n, d}, where n is the public modulus and d the private exponent. Storing the private key this way requires 4b bits.

Alternatively, in a non-CRT application, the private key could be stored simply as {p, q}, where p and q are the prime factors of n. Each time a private-key operation is performed, n and d are computed from the stored values of p and q. When stored in this way, the private key requires 2b bits. This is a savings by a factor of 2 over storing the key as {n, d}. The computation of n from p and q is a single multiply operation, since n= pq. This is an inexpensive operation compared to modular exponentiation, and since it is a single operation, it introduces no new vulnerability of exposing p and q. However, as with $d_p$ and $d_q$ in the CRT case, the computation of d from p and q may be a significant computational expense, and it may introduce a security vulnerability due to a computational sequence that varies with the values of p and q.

Accordingly, it is an object of this invention to provide a parameterization of the RSA private key for CRT applications that uses less storage space than the full parameter set {p, q, $d_p$, $d_q$, v} and that provides better computational efficiency than the minimal parameter set {p, q}.

It is also an object of this invention to provide a parameterization of the RSA private key for non-CRT applications that uses less storage space than the full parameter set {n, d} and that provides better computational efficiency than the minimal parameter set {p, q}.

It is also an object of this invention to provide a means for computing the CRT parameters $d_p$ and $d_q$, and the non-CRT parameter d, in a manner such that the computational sequence is independent of the values of the prime factors p and q, so as to reduce vulnerability to attacks that exploit such dependence.

BRIEF DESCRIPTION OF THE INVENTION

To overcome these and other shortcomings of the prior art, disclosed herein is an apparatus and method for providing a cryptography private key storage and recovery scheme that both lessens space requirements and enhances security. More particularly, the system of the present invention provides a means for deriving the private key from stored parameters not previously employed and provides a means for computing certain parameters while at the same time reducing security vulnerabilities.

One aspect of this invention is to replace the CRT parameters $d_p$ and $d_q$, and the non-CRT parameter d, with smaller parameters $k_p$, $k_q$, and k, respectively. The values of $k_p$, $k_q$, and k are the values that satisfy the relationships:

$k_p(p-1) mode = 1$;

$k_q(q-1) mode = 1$;

$k(p-1)(q-1) mode\ 1$.

Each of $k_p$, $k_q$, and k has a value in the range of 1 to (e−1), inclusive. Thus, each requires no more bits than the number of bits needed to store the public exponent e. In the popular case of $e = 2^{16}+1$, each of $k_p$, $k_q$, and k can be stored as a 16-bit value, ($k_p$−1), ($k_q$−1), or (k−1), respectively.

In contrast, $d_p$ and $d_q$ each require b bits of storage, and d requires 2b bits of storage, where b is the number of bits in a prime factor p or q. A typical value for b is 512, corresponding to a public modulus having 1024 bits. In this typical case, $d_p$ and $d_q$ each require 32 times more storage space than $k_p$ and $k_q$, and d requires 64 times more storage space than k.

A CRT application that stores $k_p$ and $k_q$ can recover $d_p$ and $d_q$ by the following calculations:

$d_p = [1+(p-1)(e-k_p)]/e$;

$d_q = [1+(q-1)(e-k_q)]/e$.

A non-CRT application that stores k can recover d by the following calculation:

$d = [1+(p-1)(q-1)(e-k)]/e$.

In each of these calculations, "/" represents integer division; in each case, the dividend is a multiple of the divisor, so there is no remainder. A proof that these calculations yield the correct results is given at the end of this summary.

These calculations for $d_p$, $d_q$, and d require the application to perform division by the public exponent e. In some applications, division may be an awkward or undesirable operation. Furthermore, if an application implements the division using the usual long-division sequence of operations, the sequence of operations may depend on the values of p and q, making the private key vulnerable to attacks that exploit such dependence.

To avoid the need for division, a CRT application can recover $d_p$ and $d_q$ using the following calculations:

compute u such that ue mod $2^b=1$;

$d_p=[1+(p-1)(e-k_p)]u\,mod\,2^b$;

$d_q=[1+(q-1)(e-k_q)]u\,mod\,2^b$.

A non-CRT application can recover d without using division via the following calculation:

compute t such that te mod $2^{2b}=1$;

$d=[1+(p-1)(q-1)(e-k)]t\,mod\,2^{2b}$.

A proof that these calculations yield the correct results is given at the end of this summary.

Ignoring for the moment the computation of u and t, it is clear that these calculations for the recovery of $d_p$, $d_q$, or d are computationally inexpensive and introduce no security vulnerability. Each calculation consists of two or three integer multiplications, three or four integer additions/subtractions, and a "mod $2^b$" or "mod $2^{2b}$" operation. The multiplication, addition, and subtraction operations are similar to the operations used to implement modular exponentiation. A single modular exponentiation uses thousands of such operations, so the added burden of a few more operations is negligible. The "mod $2^b$" operation is simply truncation to b bits, and the "mod $2^{2b}$" operation is truncation to 2b bits; these, too, are negligible. The sequence of operations does not depend on the values of p or q, so the calculation can be implemented without introducing new vulnerability to attacks that exploit such dependence.

Turning now to the computation of u and t, it is easy to see there is no security issue; the computation does not involve the private key, so it introduces no potential for attack on the private key regardless of how it is implemented. It is also true that the computation is inexpensive, as follows.

First, consider the case where the public exponent e is the same for all private keys. In this case, u or t is a fixed value, so it can simply be stored once for all private keys and retrieved as needed. Even if the private keys of interest are of different lengths, that is, the value of b varies according to the private key, only one value for u or t needs to be stored, that value being the one that corresponds to the largest value of b. For values of b other than the maximum value, the stored value can simply be truncated using "mod $2^b$" for u or "mod $2^{2b}$" for t. In the popular case where $e=2^{16}+1$, it is not even necessary to store u or t; either can be generated using the inexpensive calculations:

$u=[1+(2^{32}-2^{16})+(2^{64}-2^{48})+(2^{96}-2^{80})+(2^{128}-2^{112})+\ldots]mod\,2^b$;

$t=[1+(2^{32}-2^{16})+(2^{64}-2^{48})+(2^{96}-2^{80})+(2^{128}-2^{112})+\ldots]mod\,2^{2b}$.

For other common choices of e such as e=3 or e=17, a similar calculation can be derived.

Second, consider the general case where the public exponent e is different and arbitrary for each private key. In this case, the application must calculate u or t using a general-purpose algorithm that computes the multiplicative inverse of a number with respect to a modulus that is a power of 2 (such as $2^b$ or $2^{2b}$). Such algorithms are well-known and computationally inexpensive. In many applications, such an algorithm is already implemented as part of the modular exponentiation operation; in particular, many applications that use Montgomery multiplication, which is a popular means for implementing modular exponentiation, include such an algorithm. Compared to the expense of the modular exponentiation operation, the computational expense of executing such an the algorithm is usually small.

The discussion here has focused on the case where the public modulus n is the product of two primes, p and q. This is the usual situation in the RSA scheme. However, the RSA scheme can be generalized to a modulus that is the product of j primes, where j is an integer, $j \geq 2$. Such a generalization is described in U.S. Pat. No. 5,848,159. The invention here applies to the generalized scheme. For example, consider a CRT application with prime factors $p_1, p_2, \ldots p_j$. There are j instances of the private exponent d, defined by $d_i=d$ mod $(p_i-1)$ for i=1, 2, ..., j. To apply the invention, each $d_i$ is replaced by $k_i$ when the key is stored, where $k_i$ is the value such that $k_i(p_i-1)$ mod e=1. To recover $d_i$ from $k_i$, calculate $d_i=[1+(p_i-1)(e-k_i)]/e$ or $d_i=[1+(p_i-1)(e-k_i)]u_i$ mod $2^{b_i}$, where $b_i$ is an integer such that $p_i<2^{b_i}$, and $u_i$ is the value that satisfies $eu_i$ mod $2^{b_i}=1$.

Proof of the formulas for $d_p$ and $d_q$. First it is proved that the formula $d_p=[1+(p-1)(e-k_p)]/e$     (1)

yields the correct value for $d_p$ by showing that $ed_p$ mod (p-1)=1.

Let $a=1+(p-1)(e-k_p)$. First we need to show that a is a multiple of e, so that the division operation in (1) yields an integer value. By definition, $k_p(p-1)$ mod e=1. Thus, $k_p(p-1)-1$ is a multiple of e. Since $a=e(p-1)-[k_p(p-1)-1]$, it follows that a is a multiple of e.

Now let $d_p$ be as in (1). Then $ed_p$ mod (p-1)=a mod (p-1)=1. This proves formula (1).

Next we prove that the formula $d_p=[1+(p-1)(e-k_p)]u\,mod\,2^b$     (2)

yields the correct value for $d_p$ by showing that $ed_p$ mod (p-1)=1.

Again let $a=1+(p-1)(e-k_p)$. It was previously shown that a is a multiple of e, so we can write a=ce, where c is an integer. Since $0 \leq (p-1)<2^b$ and $0 \leq (e-k_p) \leq e$, it follows that $0<a<e2^b$, hence $0<c<2^b$. Now let $d_p$ be as in (2). Then:

$ed_p$ mod (p − 1)
= e[au mod $2^b$] mod (p − 1)
= e[cue mod $2^b$] mod (p − 1)
= e[c mod $2^b$] mod (p − 1)
= ec mod (p − 1)
= a mod (p − 1)
= 1.

This proves formula (2).

The proofs for formulas $d_q=[1+(q-1)(e-k_q)]/e$     (3)

$d_q=[1+(q-1)(e-k_q)]u\,mod\,2^b$     (4)

are identical to those for formulas (1) and (2), with: $d_q$ replacing $d_p$; $k_q$ replacing $k_p$; and q replacing p.

The proofs for formulas $$d=[1+(p-1)(q-1)(e-k)]/e \quad (5)$$

$$d=[1+(p-1)(q-1)(e-k)]\,t\,mod\,2^{2b} \quad (6)$$

are similar to those for (1) and (2). The arguments for (5) and (6) are identical to those for (1) and (2), respectively, with: d replacing $d_p$; k replacing $k_p$; (p-1)(q-1) replacing (p-1); and $2^{2b}$ replacing $2^b$. The conclusion of the argument in each case is that ed mod (p-1)(q-1)=1. From this it follows that ed mod (p-1)=ed mod (q-1)=1.

Viewed from a first vantage point a cryptosystem private key recovery device is disclosed, comprising in combination, a processor, a nonvolatile memory space operatively coupled to said processor, and a set of private key parameters stored in said nonvolatile memory space utilizing less storage space than the full parameter set $\{p, q, d_p, d_q, v\}$ and providing better computational efficiency than the minimal parameter set $\{p, q\}$, wherein the private key can be recovered from said set of stored private key parameters.

Viewed from another vantage point a method for recovering a private key is disclosed, comprising in combination, storing private key parameters in a memory space, utilizing less storage space for said private key parameters than the full parameter set $\{n, d\}$, and providing better computational efficiency than the minimal parameter set $\{p, q\}$.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Figure 1:
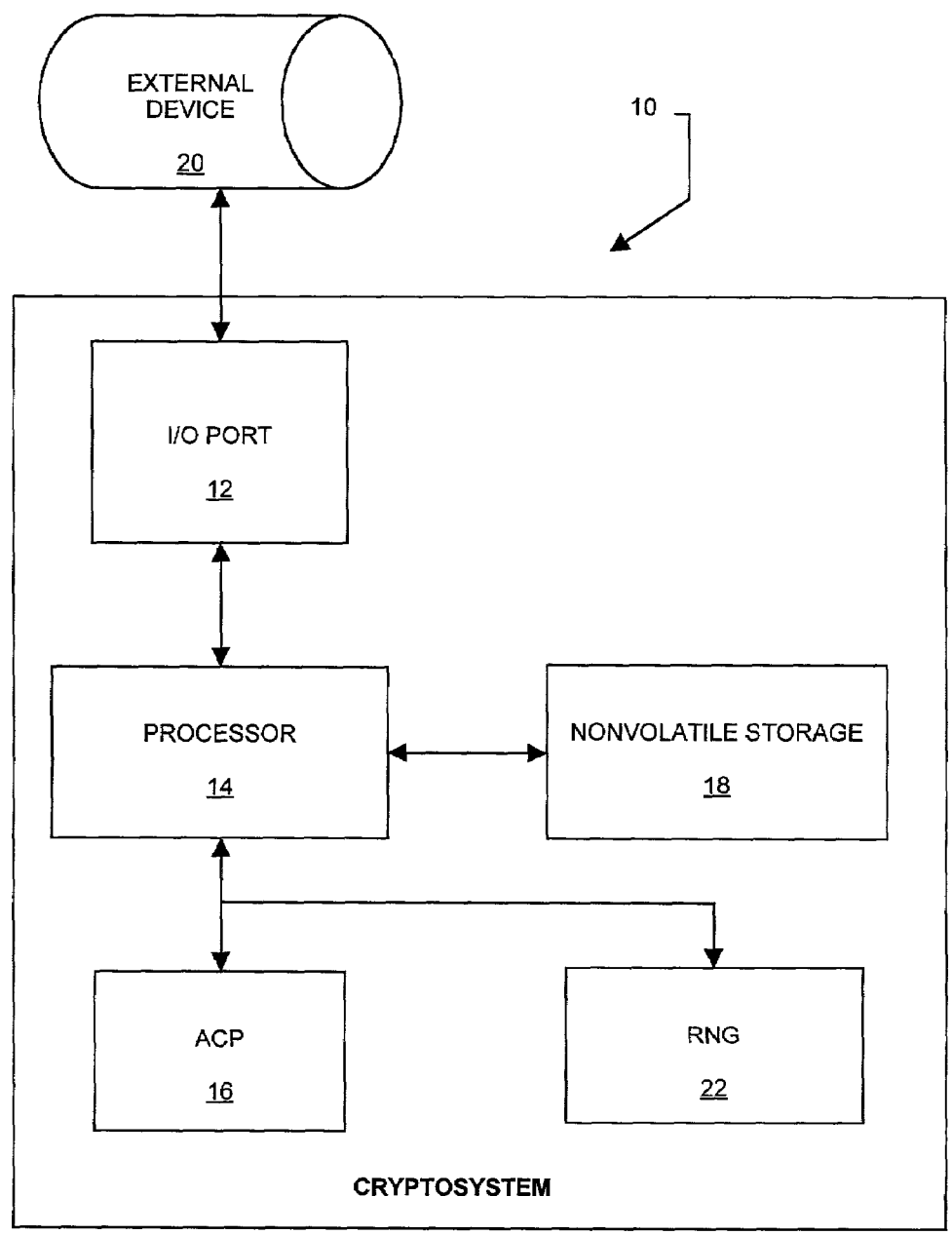
FIG. 1 is a schematic diagram of the cryptosystem environment of the present invention.

FIG. 1 illustrates a cryptosystem 10 capable of taking advantage of the invention. The cryptosystem 10 signs and decrypts messages provided to it via an I/O port 12. The cryptosystem 10 uses the RSA scheme to perform the signing and decrypting. The cryptosystem 10 has a processor 14 that controls all operations of the cryptosystem 10. The cryptosystem 10 has an arithmetic coprocessor (ACP) 16 that facilitates the computations used in the RSA scheme when signing and decrypting. The private key used to perform the signing and decrypting is stored in nonvolatile storage 18 within the crytposystem 10.

The cryptosystem 10 is capable of storing a collection of private keys in the nonvolatile storage 18 and selecting a private key to be used for a particular signing or decryption, according to commands given to it via the I/O port 12. The crytposystem 10 is capable of computing the public key that corresponds to any private key stored in the nonvolatile storage 18 and transmitting the public key to an external device 20 via the I/O port 12.

The cryptosystem 10 is capable of generating private keys and storing them in the nonvolatile storage 18. When generating a private key, the cryptosystem uses a random number generator (RNG) 22 to ensure that the prime factors p and q of the private key are arbitrarily picked. The RNG 22 provides a random seed that is applied to an algorithm that generates p and q. When storing the private key, the cryptosystem 10 may store the seed instead of storing p and q, recovering the values of p and q by applying the algorithm to the seed each time the private key is used to sign or decrypt.

The crytposystem 10 is also capable of accepting private keys provided to it by external devices 20 via the I/O port 12 and storing the private keys in the nonvolatile storage 18. An externally provided private key may itself be encrypted by the external device using the public key that corresponds to one of the private keys already present in the nonvolatile storage 18 of the cryptosystem 10. In such a case, the cryptosystem 10 decrypts the encrypted private key using the private key already in nonvolatile storage 18, then stores the decrypted private key in nonvolatile storage 18.

Regardless of whether a private key is generated by the cryptosystem 10 or provided by an external device 20, the cryptosystem 10 is capable of using the invention to reduce the amount of nonvolatile storage 18 needed to store the private key, and to recover the private key quickly and without introducing security vulnerabilities. The crytposystem 10 has many related variations of how the invention can be applied to trade off storage space versus recovery speed.

Figure 2:
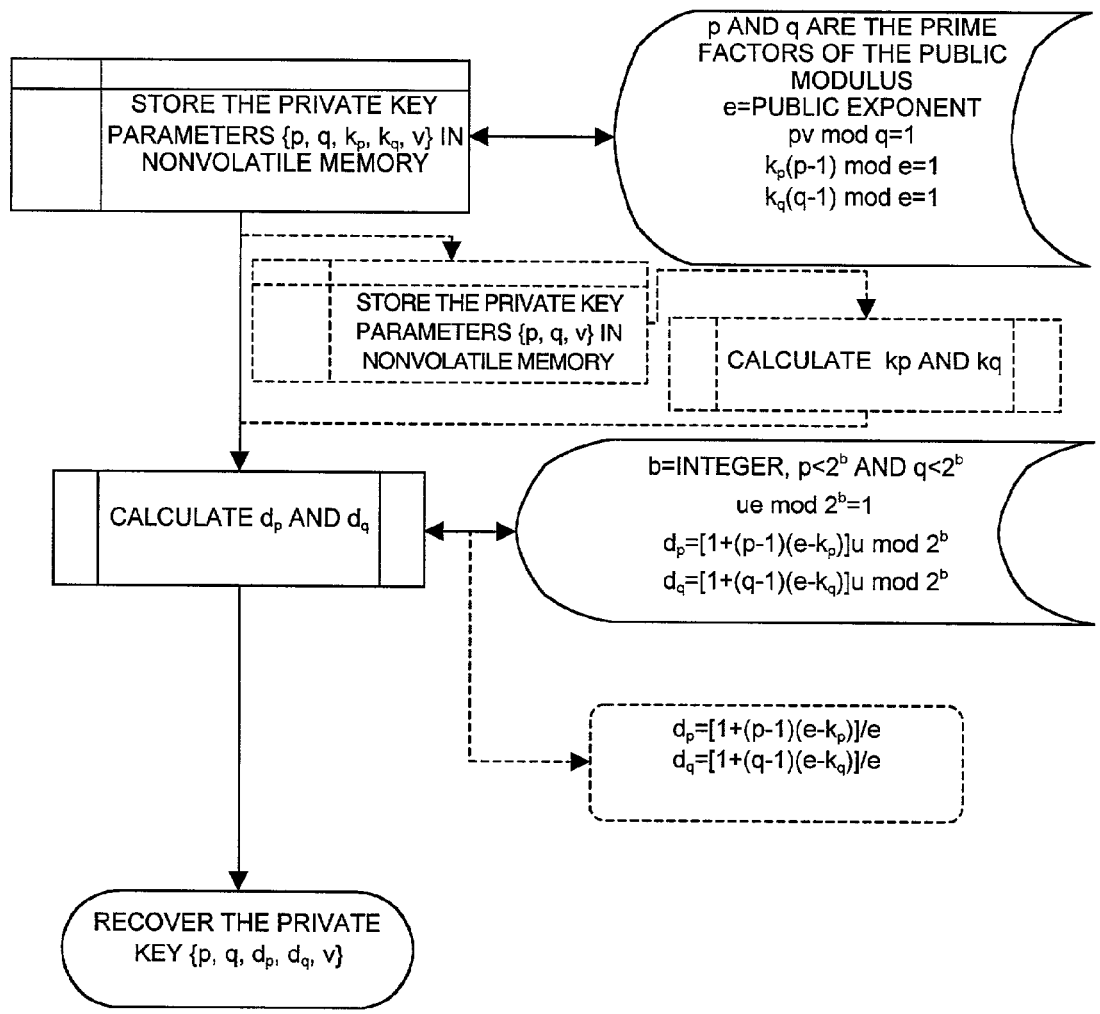
FIG. 2 is a flowchart of a first exemplary implementation of the present invention.

In a first example, and referring now to FIG. 2, initially store the private key parameters as $\{p, q, k_p, k_q, v\}$ where: p and q are the prime factors of the public modulus; v is the value satisfying pv mod q=1; $k_p$ is the value satisfying $k_p(p-1)$ mod e=1, where e is the public exponent; and $k_q$ is the value satisfying $k_q(q-1)$ mod e=1. To recover the private key in the usual CRT form of $\{p, q, d_p, d_q, v\}$, where $d_p$=d mod (p-1), $d_q$=d mod (q-1), and d is the private exponent, calculate $d_p=[1+(p-1)(e-k_p)]$ u mod $2^b$, $d_q=[1+(q-1)(e-k_q)]$ u mod $2^b$, where b is an integer such that $p<2^b$ and $q<2^b$, and u is the value satisfying ue mod $2^b$=1.

Figure 3:
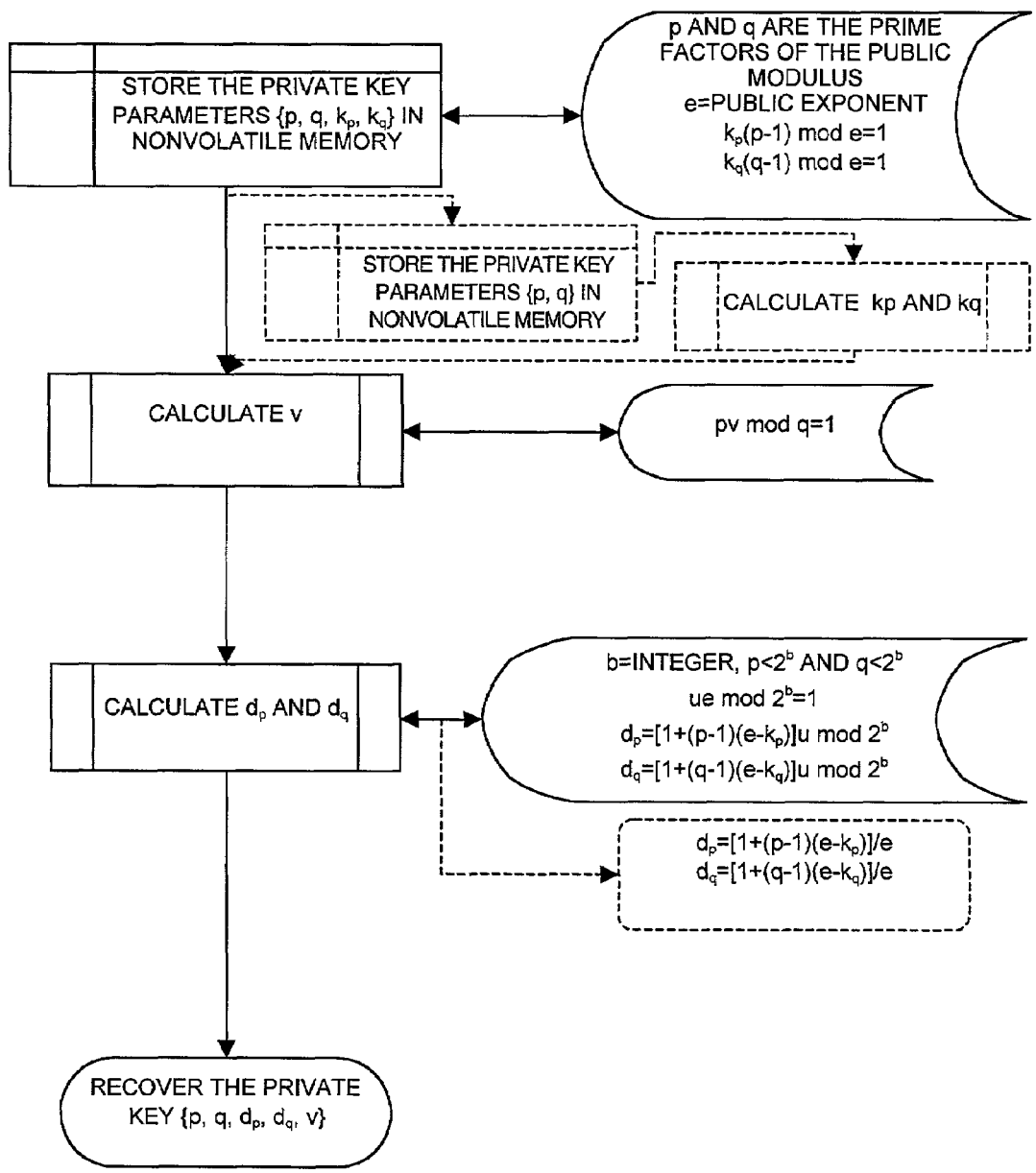
FIG. 3 is a flowchart of a second exemplary implementation of the present invention.

In a second example, and referring now to FIG. 3, initially store the private key parameters as $\{p, q, k_p, k_q\}$, where p, q, $k_p$, and $k_q$ are as in the first example. To recover the private key, first compute the value v satisfying pv mod q=1. Then proceed using $\{p, q, k_p, k_q, v\}$ as in the first example.

Figure 4:
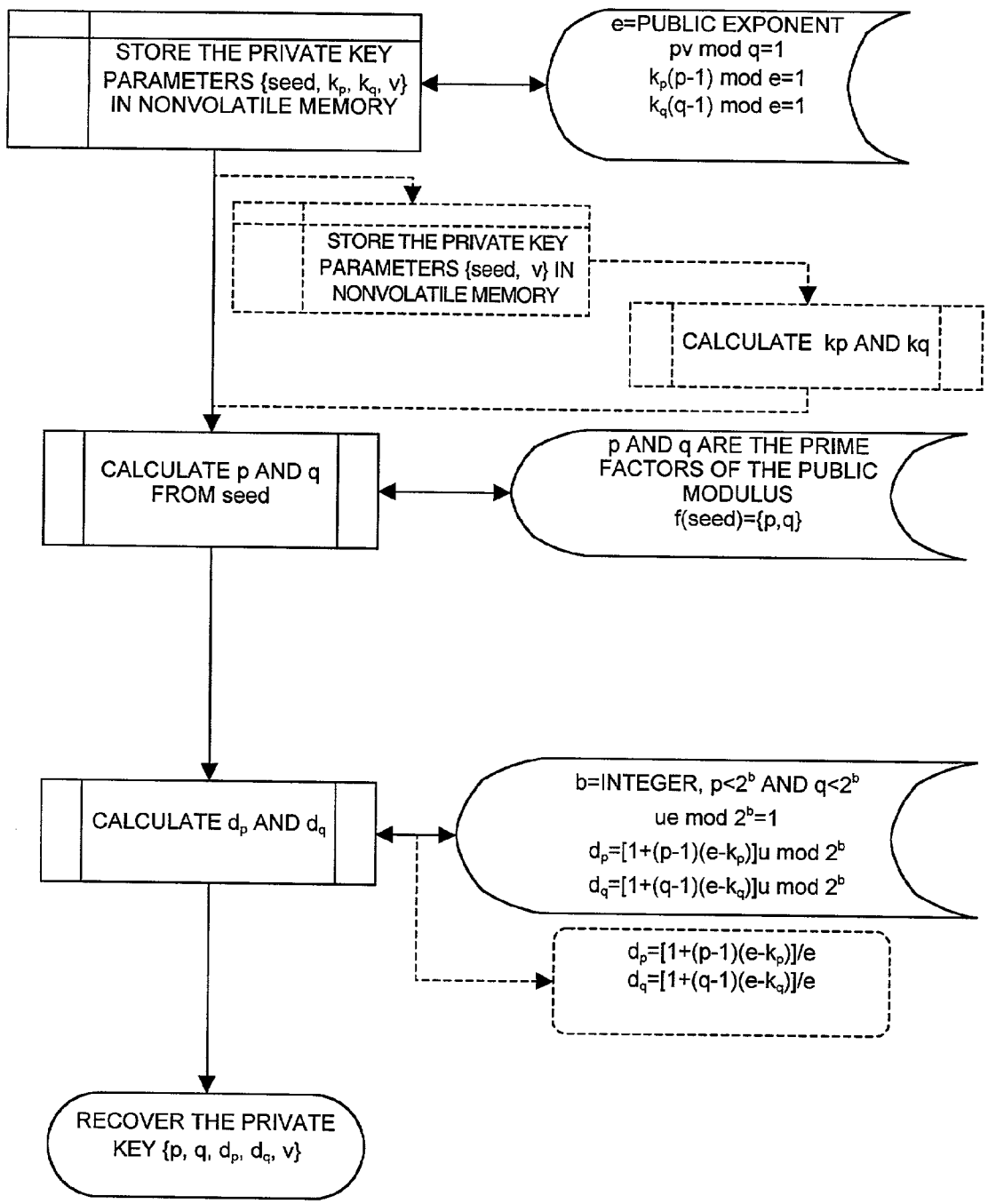
FIG. 4 is a flowchart of a third exemplary implementation of the present invention.

In a third example, and referring now to FIG. 4, initially store the private key parameters as $\{seed, k_p, k_q, v\}$, where: seed is the input to the algorithm that generates the prime factors p and q of the public modulus; and $k_p$, $k_q$, and v are as in the first example. To recover the private key, first apply the algorithm to the seed to recover the values of p and q. Then, proceed using $\{p, q, k_p, k_q, v\}$ as in the first example. Numerous seed algorithms are known in the art. See for example algorithms that generate prime numbers from a random seed, at Appendix 2 of [FIPS186] U.S. Department of Commerce/National Institute of Standards and Technology, "Digital Signature Standard (DSS)," FIPS PUB 186-2, Jan. 27, 2000.

Figure 5:
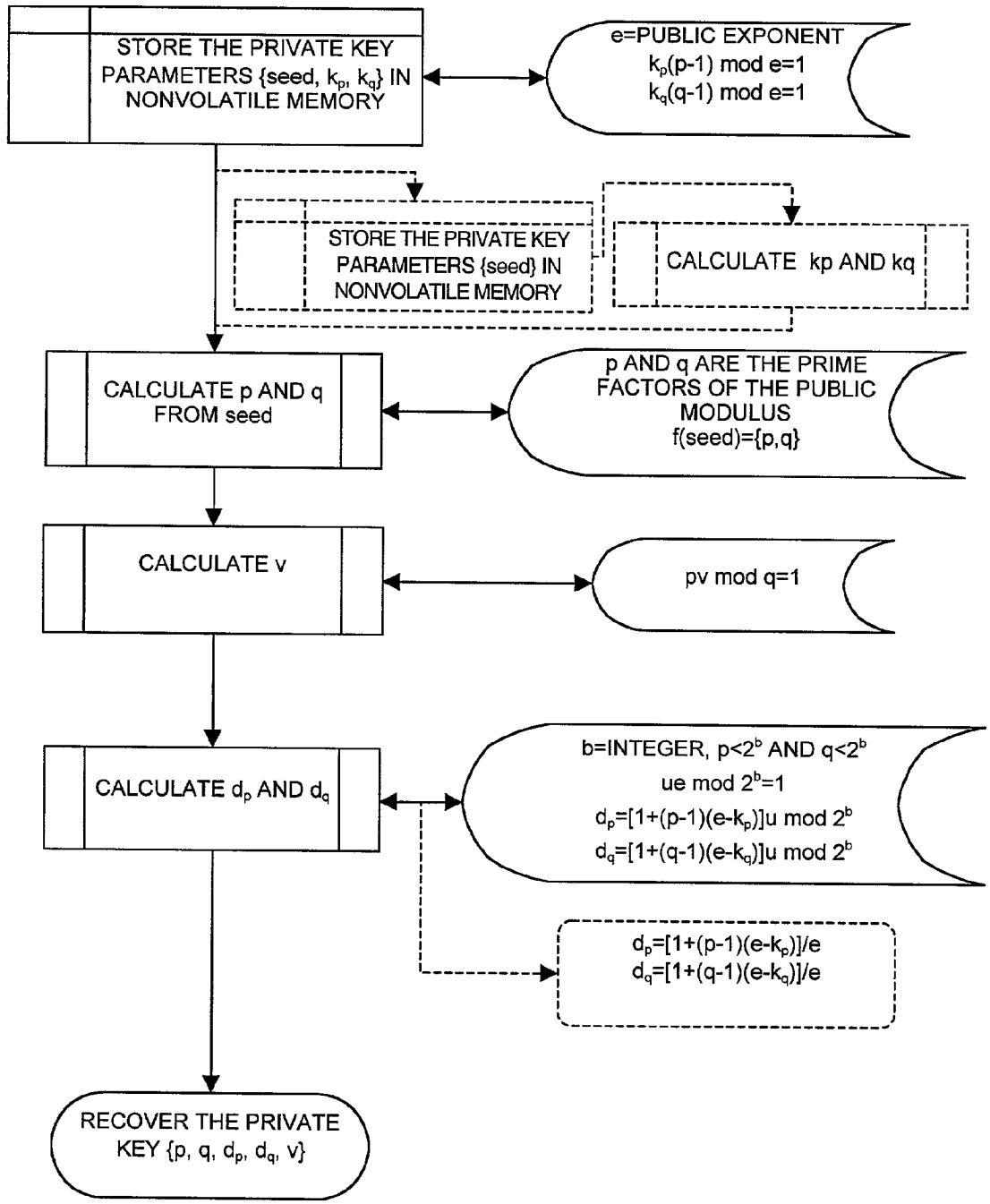
FIG. 5 is a flowchart of a fourth exemplary implementation of the present invention.

In a fourth example, and referring now to FIG. 5, initially store the private key parameters as {seed, $k_p$, $k_q$} where: seed, $k_p$ and $k_q$ are as in the third example. To recover the private key, first apply the algorithm to the seed to recover the values of p and q. Then proceed using {p, q, $k_p$, $k_q$} as in the second example.

In an alternate embodiment, initially store the private key parameters using any of the formats described in the previous four examples. When recovering the private key, instead of using the calculations for $d_p$ and $d_q$ described in the previous examples, calculate $d_p=[1+(p-1)(e-k_p)]/e$ and $d_q=[1+(q-1)(e-k_q)]/e$. Also, as another alternative in the preceding examples, instead of storing $k_p$ and $k_q$, $k_p$ and $k_q$ could be calculated from p, q, and e. Each could be computed using Euclid's algorithm, or a common variation thereof, although this may introduce a security vulnerability because the sequence of operations depends on p and q. Alternatively, in the case that e is prime, as with the popular value $e=2^{16}+1$, each can be computed using modular exponentiation, using the formulas $k_p=(p-1)^{e-2}$ mod e and $k^q=(q-1)^{e-2}$ mod e; this can be done without introducing a security vulnerability because the sequence of operations can be made independent of p and q. Since e is a small number, computational expense of computing $k_p$ and $k_q$ is often negligible compared to the computational expense of the RSA private-key operation.

Figure 6:
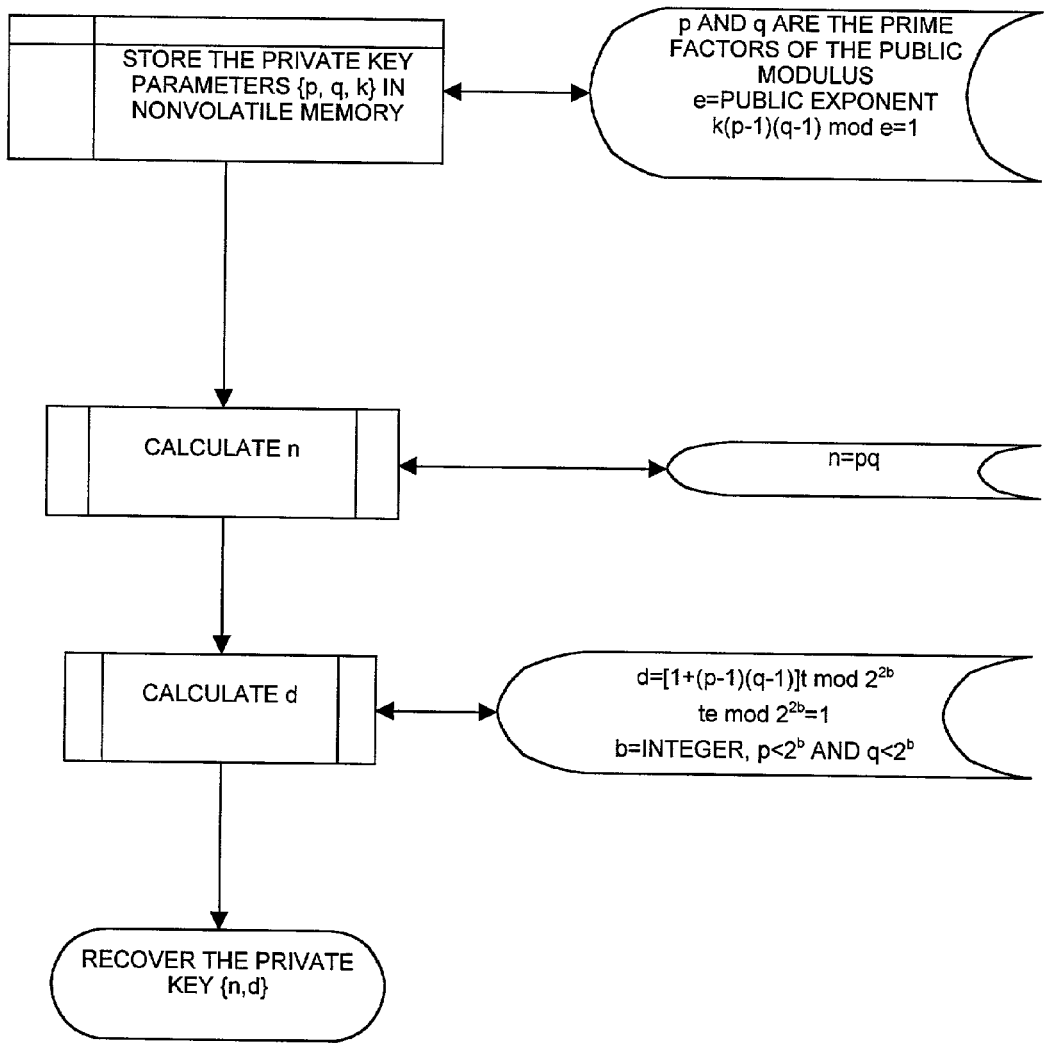
FIG. 6 is a flowchart of a fifth exemplary implementation of the present invention.

In a fifth example, and referring now to FIG. 6, initially store the private key parameters as {p, q, k} where: p and q are the prime factors of the public modulus; and k is the value satisfying k(p-1)(q-1) mod e=1, where e is the public exponent. To recover the private key in the usual non-CRT form of {n, d}, where n is the public modulus and d the private exponent, calculate n=pq and $d=[1+(p-1)(q-1)]t$ mod $2^{2b}$, where b is an integer such that $p<2^b$ and $q<2^b$, and t is the value satisfying te mod $2^{2b}=1$.

Figure 7:
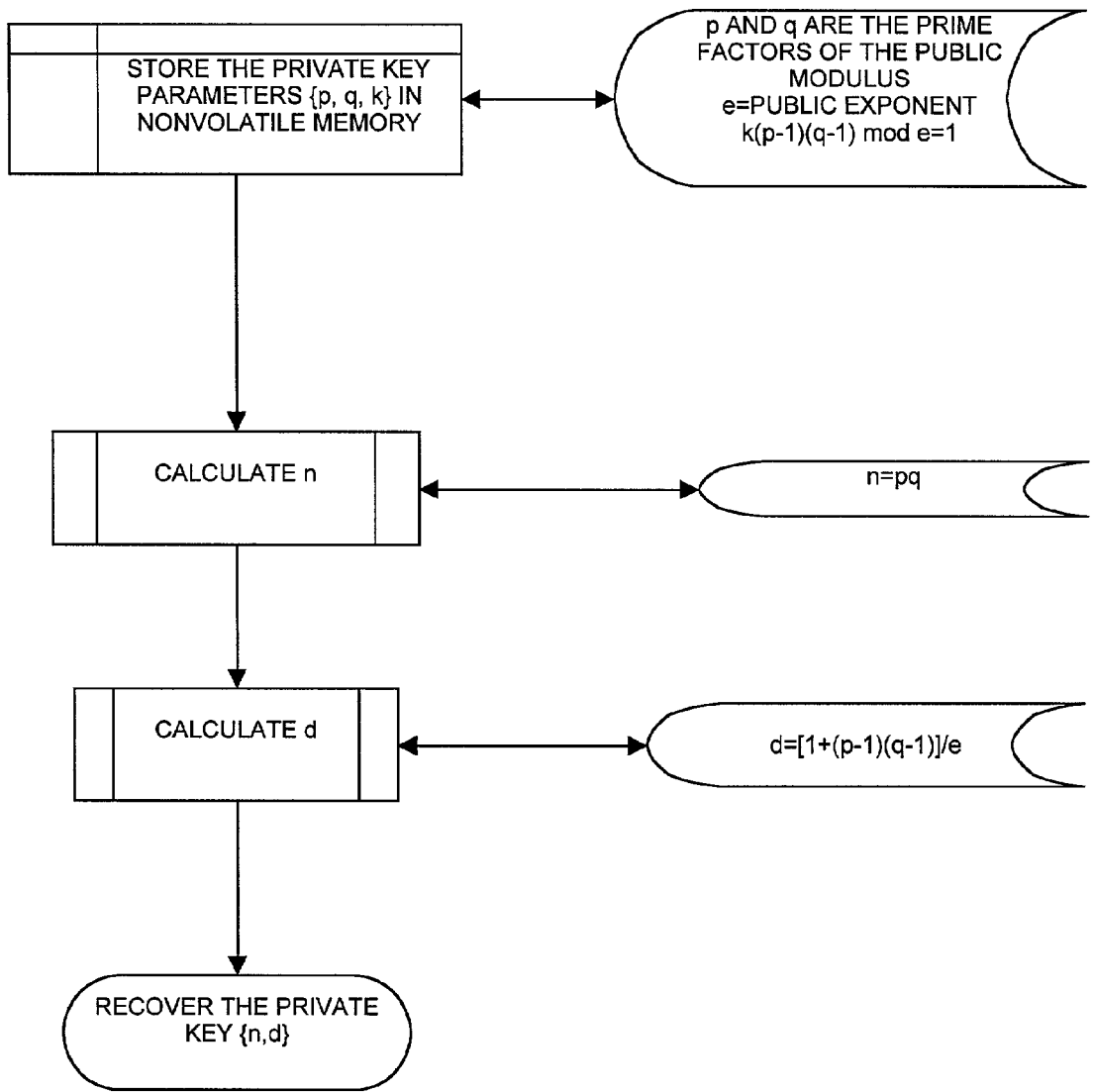
FIG. 7 is a flowchart of a sixth exemplary implementation of the present invention.

In a sixth example, and referring now to FIG. 7, initially store the private key parameters using the format in the fifth example. When recovering the private key, instead of using the calculation for d described in the fifth example, calculate $d=[1+(p-1)(q-1)]/e$.

Figure 8:
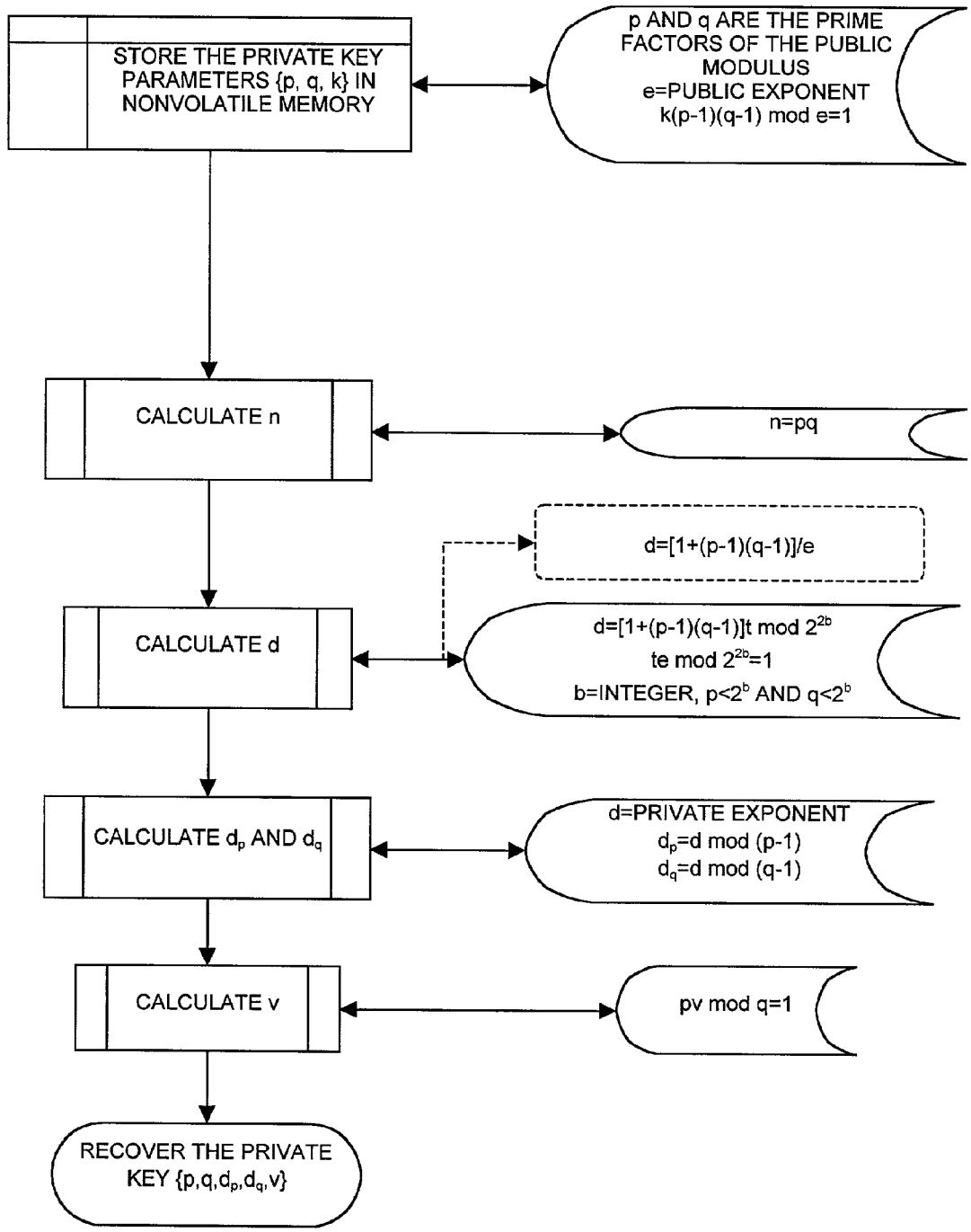
FIG. 8 is a is a flowchart of a seventh exemplary implementation of the present invention.

In a seventh example, and referring now to FIG. 8, initially store the private key parameters using the format in the fifth example. When recovering the private key, first compute the private exponent d using the calculation in either of the prior two (fifth or sixth) examples. Then, to recover the private key in the usual CRT form of {p, q, $d_p$, $d_q$, v}, calculate $d_p$=d mod (p-1) and $d_q$=d mod (q-1), and compute the value v satisfying pv mod q=1.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A cryptosystem private key recovery device, comprising in combination:
   a processor;
   a nonvolatile memory space operatively coupled to said processor; and
   a set of private key parameters stored in said nonvolatile memory space utilizing less storage space than the full parameter set {p, q, $d_p$, $d_q$, v} and providing better computational efficiency than the minimal parameter set {p, q}, wherein the private key can be recovered from said set of stored private key parameters,
   wherein said set of private key parameters comprises a parameter $k_p$, said parameter $k_p$ is derived from $k_p$(p-1) mod e=1, p is a prime factor of a public modulus, and e is a given public exponent.

2. The cryptosystem private key recovery device of claim 1 further comprising said set of private key parameters defined by the parameters {p, q, $k_p$, $k_q$, v} wherein q is a given prime factor of a public modulus, $k_q$ is derived from $k_q$(q-1) mod e=1, and v is derived from pv mod q=1.

3. The cryptosystem private key recovery device of claim 2 further comprising:
   a $d_p$ calculator in active cooperation with said processor and configured to calculate $d_p$ from $d_p=[1+(p-1)(e-k_p)]u$ mod $2^b$;
   a $d_q$ calculator in active cooperation with said processor and configured to calculate $d_q$ from $d_q=[1+(q-1)(e-k_q)]u$ mod $2^b$; and
   wherein b is an integer such that p is less than $2^b$ and q is less than $2^b$, and ue mod $2^b=1$.

4. The cryptosystem private key recovery device of claim 3 further comprising a private key parameter assembler for assembling the private key parameters {p, q, $d_p$, $d_q$, v} from said stored and calculated values.

5. The cryptosystem private key recovery device of claim 2 further comprising:
   a $d_p$ calculator in active cooperation with said processor and configured to calculate $d_p$ from $d_p=[1+(p-1)(e-k_p)]/e$; and
   a $d_q$ calculator in active cooperation with said processor and configured to calculate $d_q$ from $d_q=[1+(q-1)(e-k_q)]/e$.

6. The cryptosystem private key recovery device of claim 5 further comprising a private key parameter assembler for assembling the private key parameters {p, q, $d_p$, $d_q$, v} from said stored and calculated values.

7. The cryptosystem private key recovery device of claim 1 further comprising said set of private key parameters defined by the parameters {p, q, $k_p$, $k_q$} wherein q is a given prime factor of a public modulus and $k_q$ is derived from $k_q$(q-1) mod e=1.

8. The cryptosystem private key recovery device of claim 7 further comprising a v calculator in active cooperation with said processor and configured to calculate v from pv mod q=1.

9. The cryptosystem private key recovery device of claim 8 further comprising:
   a $d_p$ calculator in active cooperation with said processor and configured to calculate $d_p$ from $d_p=[1+(p-1)(e-k_p)]u$ mod $2^b$;
   a $d_q$ calculator in active cooperation with said processor and configured to calculate $d_q$ from $d_q=[1+(q-1)(e-k_q)]u$ mod $2^b$; and
   wherein b is an integer such that p is less than $2^b$ and q is less than $2^b$, and ue mod $2^b=1$.

10. The cryptosystem private key recovery device of claim 9 further comprising a private key parameter assembler for assembling the private key parameters {p, q, $d_p$, $d_q$, v} from said stored and calculated values.

11. The cryptosystem private key recovery device of claim 10 further comprising a private key parameter assembler for assembling the private key parameters {p, q, $d_p$, $d_q$, v} from said stored and calculated values.

12. The cryptosystem private key recovery device of claim 8 further comprising:

a $d_p$ calculator in active cooperation with said processor and configured to calculate $d_p$ from $d_p=[1+(p-1)(e-k_p)]/e$; and a $d_q$ calculator in active cooperation with said processor and configured to calculate $d_q$ from $d_q=[1+(q-1)(e-k_q)]/e$.

13. The cryptosystem private key recovery device of claim 1 further comprising said set of private key parameters defined by the parameters {seed, $k_p$, $k_q$, v} wherein $k_q$ is derived from $k_q(q-1)$ mod $e=1$, v is derived from pv mod $q=1$, and seed is a value derived from a random number generator.

14. The cryptosystem private key recovery device of claim 13 further comprising:

a p calculator in active cooperation with said processor and configured to calculate p from said seed; and a q calculator in active cooperation with said processor and configured to calculate q from said seed.

15. The cryptosystem private key recovery device of claim 14 further comprising:

a $d_p$ calculator in active cooperation with said processor and configured to calculate $d_p$ from $d_p=[1+(p-1)(e-k_p)]u$ mod $2^b$;

a $d_q$ calculator in active cooperation with said processor and configured to calculate $d_q$ from $d_q=[1+(q-1)(e-k_q)]u$ mod $2^b$; and wherein b is an integer such that p is less than $2^b$ and q is less than $2^b$, and ue mod $2^b=1$.

16. The cryptosystem private key recovery device of claim 15 further comprising a private key parameter assembler for assembling the private key parameters {p, q, $d_p$, $d_q$, v} from said stored and calculated values.

17. The cryptosystem private key recovery device of claim 14 further comprising:

a $d_p$ calculator in active cooperation with said processor and configured to calculate $d_p$ from $d_p=[1+(p-1)(e-k_p)]/e$; and a $d_q$ calculator in active cooperation with said processor and configured to calculate $d_q$ from $d_q=[1+(q-1)(e-k_q)]/e$.

18. The cryptosystem private key recovery device of claim 17 further comprising a private key parameter assembler for assembling the private key parameters {p, q, $d_p$, $d_q$, v} from said stored and calculated values.

19. The cryptosystem private key recovery device of claim 1 further comprising said set of private key parameters defined by the parameters {seed, $k_p$, $k_q$} wherein $k_q$ is derived from $k_q(q-1)$ mod $e=1$ and seed is a value derived from a random number generator.

20. The cryptosystem private key recovery device of claim 19 further comprising:

a p calculator in active cooperation with said processor and capable of calculating p from said seed; and a q calculator in active cooperation with said processor and capable of calculating q from said seed.

21. The cryptosystem private key recovery device of claim 20 further comprising a v calculator in active cooperation with said processor and configured to calculate v from pv mod $q=1$.

22. The cryptosystem private key recovery device of claim 21 further comprising:

a $d_p$ calculator in active cooperation with said processor and configured to calculate $d_p$ from $d_p=[1+(p-1)(e-k_p)]u$ mod $2^b$;

a $d_q$ calculator in active cooperation with said processor and configured to calculate $d_q$ from $d_q=[1+(q-1)(e-k_q)]u$ mod $2^b$; and wherein b is an integer such that p is less than $2^b$ and q is less than $2^b$, and ue mod $2^b=1$.

23. The cryptosystem private key recovery device of claim 22 further comprising a private key parameter assembler for assembling the private key parameters {p, q, $d_p$, $d_q$, v} from said stored and calculated values.

24. The cryptosystem private key recovery device of claim 21 further comprising:

a $d_p$ calculator in active cooperation with said processor and configured to calculate $d_p$ from $d_p=[1+(p-1)(e-k_p)]/e$; and a $d_q$ calculator in active cooperation with said processor and configured to calculate $d_q$ from $d_q=[1+(q-1)(e-k_q)]/e$.

25. The cryptosystem private key recovery device of claim 24 further comprising a private key parameter assembler for assembling the private key parameters {p, q, $d_p$, $d_q$, v} from said stored and calculated values.

26. A cryptosystem private key recovery device comprising in combination:

a processor;

a nonvolatile memory space operatively coupled to said processor; and a set of private key parameters stored in said nonvolatile memory space utilizing less storage space than the full parameter set {p, q, $d_p$, $d_q$, v} and providing better computational efficiency than the minimal parameter set {p, q}, wherein said private key recovery device is configured to recover a private key from said set of stored private key parameters utilizing equation $k_p$ (p-1) mod $e=1$, wherein $k_p$ is a private key parameter, p is a prime factor of a public modulus, and e is a given public exponent.

27. The cryptosystem private key recovery device of claim 26 further comprising said set of private key parameters defined by the parameters {p, g, v} wherein q is a given prime factor of a public modulus and v is derived from pv mod $q=1$.

28. The cryptosystem private key recovery device of claim 27 further comprising:

a $k_p$ calculator in active cooperation with said processor and configured to calculate $k_p$ from $k_p$ (p-1) mod $e=1$; and a $k_q$ calculator in active cooperation with said processor and configured to calculate $k_q$ from $k_q$ (q-1) mod $e=1$.

29. The cryptosystem private key recovery device of claim 28 further comprising a $d_p$ calculator in active cooperation with said processor and configured to calculate $d_p$ from $d_p=[1+(p-1)(e-k_p)]u$ mod $2^b$;

a $d_q$ calculator in active cooperation with said processor and configured to calculate $d_q$ from $d_q=[1+(q-1)(e-k_q)]u$ mod $2^b$; and wherein b is an integer such that p is less than $2^b$ and q is less than $2^b$, and ue mod $2^b=1$.

30. The cryptosystem private key recovery device of claim 29 further comprising a private key parameter assembler for assembling the private key parameters {p, q, $d_p$, $d_q$, v} from said stored and calculated values.

31. The cryptosystem private key recovery device of claim 28 further comprising:

a $d_p$ calculator in active cooperation with said processor and configured to calculate $d_p$ from $d_p=[1+(p-1)(e-k_p)]/e$; and a $d_q$ calculator in active cooperation with said processor and configured to calculate $d_q$ from $d_q=[1+(q-1)(e-k_q)]/e$.

32. The cryptosystem private key recovery device of claim 31 further comprising a private key parameter assembler for assembling the private key parameters $\{p, q, d_p, d_q, v\}$ from said stored and calculated values.

33. The cryptosystem private key recovery device of claim 26 further comprising said set of private key parameters defined by the parameters $\{p, q\}$ wherein q is a given prime factor of a public modulus.

34. The cryptosystem private key recovery device of claim 33 further comprising:
a $k_p$ calculator in active cooperation with said processor and configured to calculate $k_p$ from $k_p(p-1) \bmod e=1$; and
a $k_q$ calculator in active cooperation with said processor and configured to calculate $k_q$ from $k_q(q-1) \bmod e=1$.

35. The cryptosystem private key recovery device of claim 34 further comprising a v calculator in active cooperation with said processor and configured to calculate v from $pv \bmod q=1$.

36. The cryptosystem private key recovery device of claim 35 further comprising:
a $d_p$ calculator in active cooperation with said processor and configured to calculate $d_p$ from $d_p=[1+(p-1)(e-k_p)]u \bmod 2^b$;
a $d_q$ calculator in active cooperation with said processor and configured to calculate $d_q$ from $d_q=[1+(q-1)(e-k_q)]u \bmod 2^b$; and
wherein b is an integer such that p is less than $2^b$ and q is less than $2^b$, and $ue \bmod 2^b=1$.

37. The cryptosystem private key recovery device of claim 36 further comprising a private key parameter assembler for assembling the private key parameters $\{p, q, d_p, d_q, v\}$ from said stored and calculated values.

38. The cryptosystem private key recovery device of claim 35 further comprising:
a $d_p$ calculator in active cooperation with said processor and configured to calculate $d_p$ from $d_p=[1+(p-1)(e-k_p)]/e$; and
a $d_q$ calculator in active cooperation with said processor and configured to calculate $d_q$ from $d_q=[1+(q-1)(e-k_q)]/e$.

39. The cryptosystem private key recovery device of claim 38 further comprising a private key parameter assembler for assembling the private key parameters $\{p, q, d_p, d_q, v\}$ from said stored and calculated values.

40. The cryptosystem private key recovery device of claim 26 further comprising said set of private key parameters defined by the parameters $\{seed, v\}$ wherein v is derived from $pv \bmod q=1$, and seed is a value derived from a random number generator.

41. The cryptosystem private key recovery device of claim 40 further comprising:
a p calculator in active cooperation with said processor and configured to calculate p from said seed; and
a q calculator in active cooperation with said processor and configured to calculate q from said seed.

42. The cryptosystem private key recovery device of claim 41 further comprising:
a $k_p$ calculator in active cooperation with said processor and configured to calculate $k_p$ from $k_p(p-1) \bmod e=1$; and
a $k_q$ calculator in active cooperation with said processor and configured to calculate $k_q$ from $k_q(q-1) \bmod e=1$.

43. The cryptosystem private key recovery device of claim 42 further comprising:
a $d_p$ calculator in active cooperation with said processor and configured to calculate $d_p$ from $d_p=[1+(p-1)(e-k_p)]u \bmod 2^b$;
a $d_q$ calculator in active cooperation with said processor and configured to calculate $d_q$ from $d_q=[1+(q-1)(e-k_q)]u \bmod 2^b$; and
wherein b is an integer such that p is less than $2^b$ and q is less than $2^b$, and $ue \bmod 2^b=1$.

44. The cryptosystem private key recovery device of claim 43 further comprising a private key parameter assembler for assembling the private key parameters $\{p, q, d_p, d_q, v\}$ from said stored and calculated values.

45. The cryptosystem private key recovery device of claim 42 further comprising:
a $d_p$ calculator in active cooperation with said processor and configured to calculate $d_p$ from $d_p=[1+(p-1)(e-k_p)]/e$; and
a $d_q$ calculator in active cooperation with said processor and configured to calculate $d_q$ from $d_q=[1+(q-1)(e-k_q)]/e$.

46. The cryptosystem private key recovery device of claim 45 further comprising a private key parameter assembler for assembling the private key parameters $\{p, q, d_p, d_q, v\}$ from said stored and calculated values.

47. The cryptosystem private key recovery device of claim 26 further comprising said set of private key parameters defined by the parameters $\{seed\}$ wherein seed is a value derived from a random number generator.

48. The cryptosystem private key recovery device of claim 47 further comprising:
a p calculator in active cooperation with said processor and capable of calculating p from said seed; and
a q calculator in active cooperation with said processor and capable of calculating q from said seed.

49. The cryptosystem private key recovery device of claim 48 further comprising:
a $k_p$ calculator in active cooperation with said processor and configured to calculate $k_p$ from $k_p(p-1) \bmod e=1$; and
a $k_q$ calculator in active cooperation with said processor and configured to calculate $k_q$ from $k_q(q-1) \bmod e=1$.

50. The cryptosystem private key recovery device of claim 49 further comprising a v calculator in active cooperation with said processor and configured to calculate v from $pv \bmod q=1$.

51. The cryptosystem private key recovery device of claim 50 further comprising:
a $d_p$ calculator in active cooperation with said processor and configured to calculate $d_p$ from $d_p=[1+(p-1)(e-k_p)]u \bmod 2^b$;
a $d_q$ calculator in active cooperation with said processor and configured to calculate $d_q$ from $d_q=[1+(q-1)(e-k_q)]u \bmod 2^b$; and
wherein b is an integer such that p is less than $2^b$ and q is less than $2^b$, and $ue \bmod 2^b=1$.

52. The cryptosystem private key recovery device of claim 51 further comprising a private key parameter assembler for assembling the private key parameters $\{p, q, d_p, d_q, v\}$ from said stored and calculated values.

53. The cryptosystem private key recovery device of claim 50 further comprising:
a $d_p$ calculator in active cooperation with said processor and configured to calculate $d_p$ from $d_p=[1+(p-1)(e-k_p)]/e$; and a $d_q$ calculator in active cooperation with said processor and configured to calculate $d_q$ from $d_q=[1+(q-1)(e-k_q)]/e$.

54. The cryptosystem private key recovery device of claim 53 further comprising a private key parameter assembler for assembling the private key parameters {p, q, $d_p$, $d_q$, v} from said stored and calculated values.

55. A cryptosystem private key recovery device, comprising in combination:
a processor;
a nonvolatile memory space operatively coupled to said processor; and
a set of private key parameters stored in said nonvolatile memory space and utilizing less storage space than the full parameter set {n, d} and providing better computational efficiency than the minimal parameter set {p, q},
wherein said set of private key parameters comprises a parameter k, said parameter k is derived from k(p−1)(q−1) mod e=1, p and q are given prime factors of a public modulus, and e is a given public exponent.

56. The cryptosystem private key recovery device of claim 55 further comprising said set of private key parameters defined by the parameters {p, q, k}.

57. The cryptosystem private key recovery device of claim 56 further comprising a n calculator in active cooperation with said processor and configured to calculate n from n=pq.

58. The cryptosystem private key recovery device of claim 57 further comprising a d calculator in active cooperation with said processor and configured to calculate d from $d=[1+(p-1)(q-1)]t \mod 2^{2b}$, wherein te mod $2^{2b}=1$ and b is an integer such that p is less than $2^b$ and q is less than $2^b$.

59. The cryptosystem private key recovery device of claim 58 further comprising a private key parameter assembler for assembling the private key parameters {n, d} from said stored and calculated values.

60. The cryptosystem private key recovery device of claim 58 further comprising:
a $d_p$ calculator in active cooperation with said processor and configured to calculate $d_p$ from $d_p=d \mod (p-1)$; and
a $d_q$ calculator in active cooperation with said processor and configured to calculate $d_q$ from $d_q=d \mod (q-1)$.

61. The cryptosystem private key recovery device of claim 60 further comprising a v calculator in active cooperation with said processor and configured to calculate v from pv mod q=1.

62. The cryptosystem private key recovery device of claim 61 further comprising a private key parameter assembler for assembling the private key parameters {p, q, $d_p$, $d_q$, v} from said stored and calculated values.

63. The cryptosystem private key recovery device of claim 57 further comprising a d calculator in active cooperation with said processor and configured to calculate d from d=[1+(p−1)(q−1)]/e.

64. The cryptosystem private key recovery device of claim 63 further comprising a private key parameter assembler for assembling the private key parameters {n, d} from said stored and calculated values.

65. The cryptosystem private key recovery device of claim 63 further comprising:
a $d_p$ calculator in active cooperation with said processor and configured to calculate $d_p$ from $d_p=d \mod (p-1)$; and
a $d_q$ calculator in active cooperation with said processor and configured to calculate $d_q$ from $d_q=d \mod (q-1)$.

66. The cryptosystem private key recovery device of claim 65 further comprising a v calculator in active cooperation with said processor and configured to calculate v from pv mod q=1.

67. The cryptosystem private key recovery device of claim 66 further comprising a private key parameter assembler for assembling the private key parameters {p, q, $d_p$, $d_q$, v} from said stored and calculated values.

68. A method for recovering a private key, comprising in combination:
storing private key parameters in a memory space;
utilizing less storage space for said private key parameters than the full parameter set {p, q, $d_p$, $d_q$, v}; and
providing better computational efficiency than the minimal parameter set {p, q},
wherein said set of private key parameters comprises a parameter $k_p$, said parameter $k_p$ is derived from $k_p(p-1) \mod e=1$, p is a prime factor of a public modulus, and e is a given public exponent.

69. A method for recovering a private key, comprising in combination:
storing private key parameters in a memory space;
utilizing less storage space for said private key parameters than the full parameter set {n, d}; and
providing better computational efficiency than the minimal parameter set {p, q},
wherein said set of private key parameters comprises a parameter k, said parameter k is derived from k(p−1)(q−1) mod e=1, p and q are given prime factors of a public modulus, and e is a given public exponent.

* * * * *